(12) United States Patent
Braida et al.

(10) Patent No.: US 6,317,716 B1
(45) Date of Patent: Nov. 13, 2001

(54) AUTOMATIC CUEING OF SPEECH

(75) Inventors: Louis D. Braida; Matthew Sexton, both of Arlington, MA (US); David S. Lum, Washington, DC (US); Paul Duchnowski, Brookline, MA (US); Maroula S. Bratakos, San Diego, CA (US); Jean S. Krause, Cambridge, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 09/156,716

(22) Filed: Sep. 18, 1998

Related U.S. Application Data (60) Provisional application No. 60/059,409, filed on Sep. 19, 1997.

(51) Int. Cl.$^7$ .................................................. G10L 21/00
(52) U.S. Cl. ........................................ 704/275; 704/270
(58) Field of Search .................................. 704/270, 275, 704/256, 255

(56) References Cited

U.S. PATENT DOCUMENTS

| | | | |
|---|---|---|---|
| 4,333,152 | * 6/1982 | Best | 364/521 |
| 4,884,972 | * 12/1989 | Gasper | 704/270 |
| 4,972,486 | 11/1990 | Cornett et al. | 381/48 |
| 5,111,409 | * 5/1992 | Gasper et al. | 704/270 |
| 5,278,943 | * 1/1994 | Gasper et al. | 704/200 |

(List continued on next page.)

FOREIGN PATENT DOCUMENTS 1182690   2/1985   (CA).

OTHER PUBLICATIONS

Cornett, et al., "Automatic Cued Speech", Papers from the Research Conference on Speech Processing Aids for the Deaf, Ed. by J.M. Pickett, pp. 224–239, 1977.

Ebrahimi, et al., "Peripheral Vision Lipreading Aid", IEEE Transactions on Biomedical Engineering, 38(10):944–952, 1991.

Gengel, "Upton's Wearable Eyeglass Speechreading Aid: History and Current Status", Hearing and Davis: Essays Honoring Hallowell Davis, Hirsh et al., ed., Washington Univ. Press, St. Louis, MO, pp. 291–299, 1976.

(List continued on next page.)

*Primary Examiner*—Fan Tsang
*Assistant Examiner*—Michael N. Opsasnick
(74) *Attorney, Agent, or Firm*—Fish & Richardson P.C.

(57) ABSTRACT

In a computer-based method for use in speech cueing, speech elements initially delivered by a speaker are recognized. A sequence of video images is displayed showing the speaker delivering the speech elements. The displayed video sequence is delayed relative to the initial delivery of the speech elements by the speaker. In conjunction with displaying the sequence of video images, images of cues corresponding to the recognized speech elements are displayed with a timing that is synchronized with the delayed sequence of video images. Each of the cues comprises a representation of a human hand in a discrete position. Successive different cues are displayed in a manner to suggest to a viewer smooth motion between the successive cues. The speech elements are recognized based on an acoustic signal from the speaker as the speech elements are delivered. Images of cues corresponding to the recognized speech elements are displayed with a selected timing that controls the synchronization of the display of the visual cues relative to timing of the speech elements. Cues can be displayed with a supplementary visual feature to enhance comprehension by a cue receiver. Additionally, various speech recognition techniques are provided.

32 Claims, 5 Drawing Sheets

U.S. PATENT DOCUMENTS

| | | | |
|---|---|---|---|
| 5,615,299 | * 3/1997 | Bahl et al. | 704/254 |
| 5,621,859 | * 4/1997 | Schwartz et al. | 704/256 |
| 5,638,487 | * 6/1997 | Chigier | 704/253 |
| 5,758,318 | * 5/1998 | Kojima et al. | 704/251 |
| 5,806,036 | * 9/1998 | Stork | 704/260 |
| 6,112,177 | * 8/2000 | Cosatto et al. | 704/260 |

OTHER PUBLICATIONS

"Autocuer Field Tests Begin", Hypotenuse, Research Triangle Institute, Sep.–Oct. 1984.

"Autocuer Project Technical Status Report", Research Triangle Institute, North Carolina, Nov. 7, 1984.

Beadles et al., "A Feasibility Study for the Development of a Speech Autocuer", Research Triangle Institute, North Carolina, Jun. 1979.

Lee, Automatic Speech Recognition, "The Development of the SPHINX System", Kluwer Academic Publishers, Boston, MA, 1989.

Schwartz et al., "Context–Dependent Modeling for Acoustic–Phonetic Recognition of Continuous Speech", Proceedings of ICASSP–85, Tampa, FL, pp. 31.3.1–4, 1205–1209, 1985.

Upton, "Wearable Eyeglass Speechreading Aid", American Annals of the Deaf, 113:222–229.

Braida et al., "Automatic Generation of Visual, Synchronized, Supplementary Cues for Speechreading" Preferred Embodiment Description, Sep. 10, 1997, Sensory Communications Group, MIT.

Braida et al., "Automatic Generation of Visual, Synchronized, Supplementary Cues for Speechreading" Essence of the Invention, Aug. 10, 1997, Sensory Communications Group, MIT.

Sexton "A Video Display System for an Automatic Cue Generator" Massachusetts Institute of Technology, 1997.

I can Cue! Software Series; Educators' Software, Dept. G; 765 N. Rengstorff #20; Mt. View, CA 94043.

1996 ASA Meeting Abstract; "Sensitivity of Cued Speech Reception to Cue Imperfections"; Bratakos et al., Research Laboratory of Electronics, M.I.T., Cambridge, MA 02139.

National Cued Speech Association (NCSA) "Guidelines on the Mechanics of Cueing", Cued Speech Journal, V, 1994.

Bratakos et al., "Toward the Automatic Generation of Cued Speech" Submitted for publication in The Cued Speech Journal, May 5, 1997.

Kunov et al., "Measurement of Performance of a Peripheral Vision Lipreading Aid," Scand Audiol; 20: 131–137, 1991.

Bahl et al., "A Maximum Likelihood Approach to Continuous Speech Recognition" IEEE Transactions on Pattern Analysis and Machine Intelligence, PAMI 5(2):179–190, 1983.

Beadles, "Personal Communication to L.D. Briada Describing the Performance of the RTI Autocuer and the Results of Tests with Simulations of the Autocuer", Aug. 31, 1989.

Boothroyd et al., "Studies of Tactile Speechreading Enhancement in Deaf Adults" Seminars in Hearing, 16(4):328–342, 1995.

Boothroyd et al., "Mathematical Treatment of Context Effects in Phoneme and Word Recognition", Journal of Acoustical Society of America, 84:101–114, 1988.

Braida, "Crossmodal Integration in the Identification of Consonant Segments", qjep, 43A(3):647–677, 1991.

Bratakos, "The Effect of Imperfect Cues on the Reception of Cued Speech", Department of Electrical Engineering and Computer Science, M.I.T. 1995.

Clarke, et al., "The Effects of Using Cued Speech: a Follow up Study", Volta Review, 78:23–34, 1976.

Cornett, "Cued speech", American Annals of the Deaf, 112:3–13, 1967.

Davis et al., Hearing and Deafness, Holt Reinhart and Winston, NY, 1970.

Duchnowski, A New Structure for Automatic Speech Recognition, Ph.D. Thesis M.I.T., Cambridge, MA, 1993.

Erber, "Auditory, Visual and Auditory–Visual Recognition of Consonants by Children with Normal and Impaired Hearing", Journal of Speech and Hearing Research, 14:413–422, 1972.

Fischer et al., Effects of Rate of Presentation on the Reception of American Sign Language, Nov. 19, 1997.

Grant et al., "Auditory Supplements to Speechreading: Combining Amplitude Envelope Cues from Different Spectral Regions of Speech", Journal of the Acoustical Society of America, 95:1065–1073, 1994.

Grant et al., "Single Band Amplitude Envelope Cues as an Aid to Speechreading", Quarterly Journal of Experimental Psychology, 43A:621–645, 1991.

Hack et al., "Auditory, Visual, and Auditory–Visual Perception of Vowels by Hearing–Impaired Children", Journal of Speech and Hearing Research, 25:100–107, 1982.

Huggins et al., "Vidvox Human Factors Investigation", Tech. rep. 6187, BBN Laboratories, Cambridge, MA, 1986.

IEEE (1969). "IEEE Recommended Practices for Speech Quality Measurements". Tech rep., IEEE, New York, 1969.

Kalikow et al., "Development of a Test of Speech Intelligibility in Noise Using Sentence Materials with Controlled Word Predictability", Journal of the Acoustical Society of America, 61:1337–1351, 1977.

Kaplan, "The Effects of Cued Speech on the Speechreading Ability of the Deaf", Ph.D. thesis, University of Maryland, 1974.

Krasner et al., "Development of a Vidvox Feasibility System", technical report, BBN Laboratories, Cambridge, MA, 1985.

Ling et al., "Cued speech: an Evaluative Study", American Annals of the Deaf, 120:480–488, 1975.

Magner, "A Speech Intelligibility Test for Deaf Children", Tech. rep., Clarke School for Deaf, Northampton, MA 1972.

Montgomery et al., "Physical Characteristics of the Lips Underlying Vowel Lipreading Performance", Journal of the Acoustical Society of America, 73:2134–2144, 1983.

Nicholls et al. "Cued Speech and the Reception of the Spoken Language", Journal of Speech and Hearing Research 25:262–269, 1982.

Plant et al., "Lipreading with Tactile Supplements, a Case Study with an Experienced Subject", Seminars in Hearing, 16(4):296–304, 1995.

Rabiner, "A Tutorial on Hidden Markov Models and Selected Applications in Speech Recognition", Proceedings of the IEEE, 77(2):257–286, 1989.

Reed et al., "Current Results of a Field Study of Adult Users of Tactile Aids" Seminars in Hearing, 16(4) 305–315, 1995.

Russell, "Vidvox Project: Final Report", Tech. Rep., Sensory Aids Foundation, Palo Alto, CA, 1986.

Sensimetrics, "Speechstation Version 3.1 Software", Tech. Rep., Sensimetrics Corp., Cambridge, MA 1994.

SMPTE, "Smpte Standard 12m–1995: Time and Control Code", Tech. Rep., Society of Motion Pictures and Television Engineers, White Plains, New York, 1995.

Uchanski et al., "Automatic Speech Recognition to Aid the Hearing Impaired: Prospects for the Automatic Generation of Cued Speech", Journal of Rehabilitation Research and Development, 31(1):20–41, 1994.

Vilaclara, "Speech Processing to Aid the Profoundly Deaf", Journal of the Acoustical Society of America 84:(S41), 1988.

Weisenberger, "Factors Influencing Benefit from Tactile Aids", Seminars in Hearing, 16(4):343–355, 1995.

Weisenberger et al., "Evaluation of Two Multichannel Tactile Aids for the Hearing Impaired", Journal of the Acoustical Society of America, 86:1764–1799, 1989.

Winer, et al., Statistical Principles in Experimental Design, New York: McGraw–Hill, 1971.

Woodland et al., "The HTK Tied–State Continuous Speech Recogniser", 2207–2219, 1993.

Wozniak et al., "Visual Vowel and Diphthong Perception from Two Horizontal Viewing Angles", Journal of Speech and Hearing Research, 22:354–365, 1979.

Young et al., "Htk: Hidden Markov Model Toolkit Version 1/5 User's Manual", Tech. rep., Entropic Research Laboratories, Inc., Washington, D.C., 1993.

Zue et al., "Acoustic Segmentation and the Phonetic Classification in the Summit System", Proceedings of ICASSP–89:534–537, 1989.

Zue et al., "Transcription and Alignment of the Timit Database", In Proceedings of the Second Symposium on Advanced Man–Machine Interface Through Spoken Language, Oahu, HI, 1988.

Zak, "Cued Speech FAQ", Last updated Jul. 13, 1996, printed from the internet Sep. 2, 1997. http://www.weizmann.ac.il/deaf–info/cued_speech.html#description.

Goldman et al., "Training Program", printed from the internet Sep. 2, 1997, http://web7.mit.edu/HSTSHS/www/postdocs/sgoldman.html.

Bratakos, "The Effect of Incorrect Cues on the Reception of Cued Speech", Master of Engineering Thesis, 1995, http://Web7.mit.edu/ASC/People/bratakos/masters.html, printed from the internet Sep. 2, 1997.

National Cued Speech Association (NCSA), "Guidelines on the Mechanics of Cueing", Cued Speech Journal, V, pp. 73–80, 1994.

Dawes, Cued Speech Team, Department of Audiology and Speech–Language Pathology, "Cued Speech Beginner's Practice Materials Booklet", Gallaudet University, Washington, D.C.

Braida, et al. "Prospects for the Automatic Generation of Cued Speech", ASHA Leader, 1997.

Besing, et al. "A Comparison of Auditory and Tactual Presentation of a Single–Band Envelope Cue as a Supplement to Speechreading", Seminars in Hearing 16(4): 316–327, 1995.

Grant, et al., "Evaluating the Articulation Index for Auditory–Visual Input", J. Acoust. Soc. Am., 89 2952–2960, 1991.

Lee, et al. "Speaker–Independent Phone Recognition Using Hidden Markov Models", IEEE Transactions on Acoustics, Speech, and Signal Processing 37(11), 1641–1648, 1989.

Lee, et al., "Speech Recognition Using Hidden Markov Models: A CMU Perspective", Speech Communication 9 497–508, 1990.

Robinson, et al. "Phoneme Recognition from the TIMIT Databas Using Recurrent Error Propagation Networks", Cambridge Univ, Tech, Rep. CUED/F–INFENG/TR.42, 1990.

Cornett et al. "The Cued Speech Resource Book: For Parents of Deaf Children", National Cued Speech Association, 1992.

Dolnick, "Deafness as Culture", The Atlantic Monthly, Sep., 1993.

Jackson, "The Theoretical Minimal Unit for Visual Speech Perception: Visemes and Coarticulation", The Volta Review, Sep. 1988.

Yang, et al., "Tracking Human Faces in Real–Time", Technical Report CMU–CS–95–210, Carnegie Mellon University, Pittsburgh, PA 15213, Nov. 1995.

Goldman, et al., "The Intelligibility of Sentences in Which Multiple Segments are Replaced by Noise Bursts", J. Acoust. Soc. Am., 95: S3010, May 1994.

Viliclara, "Traitements de la Parole Pour L'Aide aux Sourds–Profounds", (in French), Thesis No. 697, Ecole Polytechnique Federale de Lausanne.

* cited by examiner

AUTOMATIC CUEING OF SPEECH

CROSS REFERENCE TO RELATED APPLICATION

Under 35 USC §119(e)(1), this application claims priority from provisional application 60/059,409, filed Sep. 19, 1997, which is incorporated herein by reference in its entirety.

STATEMENT AS TO FEDERALLY SPONSORED RESEARCH

This invention was made with government support under Grant Number NIH-1-R01-OC02032 awarded by the National Institutes of Health. The government has certain rights in the invention.

BACKGROUND OF THE INVENTION

This invention relates to automatic cueing of speech.

Speechreading (also sometimes referred to as lipreading) is an important means of communication for the deaf and hearing-impaired. By observing the facial actions of the speaker, the listener can derive significant information about the spoken utterance. However, speechreading alone typically provides a limited basis for communication because many distinctions among speech elements are not observable visually. Cueing of speech provides some of the missing information, allowing the receiver to resolve the ambiguities inherent in speechreading.

Manually cued speech is a phonemically-based system of eight consonant and four vowel classes, each class containing between 2 and 4 phonemes. For each syllable the speaker articulates, he indicates the consonant class by a hand shape and the vowel class by hand position near his mouth. Phonemes that appear similar on speakers' lips are placed in different classes (e.g., /p/, /b/, and /m/ belong to separate cue groups). Combinations of the cues synchronized with natural speech movements make spoken language clearly visible and understandable to the speechreader. The cue receiver can identify all spoken phonemes through the combination of visible facial actions and manual cues and understand every spoken syllable that a hearing person hears. This capability can contribute to the reception of spoken language, face to face communication and the development of general language reading skills.

Although manually cued speech provides enormous benefit in the education of the deaf, the assistance it provides in day-to-day communication is limited to situations in which the speaker, or a transliterator, produces the cues. To overcome this limitation, others have developed systems that would derive and display cues similar to manual cued speech using electronic analysis of acoustic speech signals.

One implementation of artificially displayed cues is described in U.S. Pat. No. 4,972,486 by Cornett et al. (hereinafter, "Cornett"). (See also Cornett, O., Beadles, R., & Wilson, B. (1977), "Automatic cued speech", in J. M. Pickett (ed.), *Papers from the Research Conference on Speech Processing Aids for the Deaf*, pp.224–239.) In the Cornett system, a computer analyzes speech, identifies speech elements in that speech, and determines appropriate cues corresponding to those speech elements. The Cornett system displays virtual image cues corresponding to the identified cues by a pair of seven-segment LED elements, projected in the viewing field of an eyeglass lens. By activating the segments selectively, nine distinct symbol shapes for cueing phonemes are created. The cue groups selected differ from those used in manual cued speech, but, as in manual cued speech, sounds which are difficult to distinguish through speechreading alone occur in different cue groups.

SUMMARY OF THE INVENTION

In general, in one aspect, the invention features a computer-based method for use in speech cueing. In this aspect, speech elements initially delivered by a speaker are recognized. A sequence of video images is displayed showing the speaker delivering the speech elements. The displayed sequence of video images is delayed relative to the initial delivery of the speech elements by the speaker. In conjunction with displaying the sequence of video images, an image of one of the cues corresponding to the recognized speech elements is displayed with a timing that is synchronized to a visible facial action.

Embodiments of the invention may include one or more of the following features.

An audio signal corresponding to the speech elements initially delivered by the speaker is played back, the audio signal being synchronized with the displayed video sequence.

The visible facial action corresponds to the recognized speech elements corresponding to that cue. At least one of the cues has a corresponding start time for displaying the image of that cue. The start time of that cue is synchronized to a beginning of the visible facial action corresponding to the recognized speech elements corresponding to that cue. The beginning of the visible facial action is determined to be a pre-selected period of time prior to a start time of the recognized speech elements. The period of time depends on a characteristic of the recognized speech elements.

In general, in another aspect of the invention, each of the cues comprises a representation of a human hand in a discrete position. The discrete positions of two successive different cues are different. One of the different cues is displayed at positions along a path between the two discrete positions, for example, to suggest to a viewer smooth motion between the two successive cues.

Embodiments of the invention may include one or more of the following features.

Speech elements initially delivered by a speaker are recognized and the cues corresponding to the speech elements are determined based on those recognized speech elements. The motion is suggested by also displaying the other one of the different cues at positions along a path between the two discrete positions.

A period of time between the display of one of the cues in its discrete position and the display of a successive one of the cues in its discrete position is determined, where the smooth motion is suggested by displaying the cues during the determined period of time. The cues are displayed in positions other than the discrete positions during the determined period of time.

In general, in another aspect of the invention, the speech elements are recognized based on an acoustic signal from the speaker as the speech elements are delivered. The start times of the speech elements are delayed relative to the initial delivery of the speech elements by the speaker. In conjunction with displaying a sequence of video images of the speaker delivering speech elements, images of cues corresponding to the recognized speech elements are displayed at selected periods of time prior to the delayed start times of the speech elements.

Embodiments of the invention may include one or more of the following features.

The selected periods of time can be the same for all cues. The selected period of time of one cue can also be different from the selected start time of another cue. The selected periods of times can be selected based on a characteristic of the recognized speech elements.

The selected periods of time can also be selected based on start times of visible facial actions, where the visible facial actions correspond to the recognized speech elements which correspond to the cues.

The displayed video sequence is delayed relative to the initial delivery of the speech elements by the speaker and the start times the recognized speech elements are synchronized with the delayed video sequence.

In general, in another aspect, the invention features a computer-based method for use in speech cueing. A sequence of video images showing a speaker delivering speech elements is displayed and, in conjunction with displaying the sequence of video images, images of hand cues corresponding to the speech elements are displayed. Each of the hand cues includes a representation of a human hand in a discrete position. At least one of the cues is displayed with a supplementary visual feature.

Embodiments of the invention may include one or more of the following features.

Speech elements initially delivered by a speaker are recognized. The hand cues are then determined from the recognized speech elements.

The supplementary visual feature makes a cue more discriminable than when that cue is displayed without such supplementary visual feature. The supplementary visual feature can be an outline of the representation of the human hand for the cue where the outline is superimposed on the representation of the human hand. The supplementary visual feature can also be a color of the representation of the human hand for the cue, where the color is characterized by brightness, hue, and saturation values. The color can be different from the color of another cue. The supplementary visual feature can also be a size of the representation of the human hand for the cue. The supplementary visual feature can also be representation of texture in the representation of the human hand.

In general, in another aspect of the invention, speech delivered by a speaker is received. A backward search is performed on the speech using context-independent speech element models to provide estimates of speech elements likely to be present in the speech. Those estimates of speech elements are used to select context-dependent speech element models from among a set of context-dependent speech element models. A forward search is then performed on the speech using the selected plurality of context-dependent models to recognize speech elements in the speech.

Embodiments of the invention may include one or more of the following features.

The speech element models include Hidden Markov Models. The forward search and the backward search are performed on a segment of speech having a predetermined duration. As the speech elements are recognized in the segment of speech, the recognized speech elements are outputted.

In general, in another aspect of the invention, speech delivered by a speaker is received in real time and processed in real time using a speech recognition process to recognize speech elements in the speech, the speech recognition process being characterized by a parameter that controls the speed of speech element recognition by the recognition process. A delay between a point in speech being processed in the processing step and a current point in time is determined. The parameter is then adjusted based on the determined delay.

Embodiments of the invention may include one or more of the following features.

The parameter is adjusted to substantially cause the determined delay to tend toward a predetermined value.

Adjusting the parameter includes: A) if the determined delay is more than a first predetermined delay value, changing the parameter to increase the speed of speech element recognition by the recognition process; and B) if the determined delay is less than a second predetermined delay value, changing the parameter to decrease the speed. The first predetermined delay value can be the same or different from the second predetermined delay value.

Among the advantages of the invention are one or more of the following.

Embodiments of the invention require no knowledge of standard cued speech by the speaker because a computer recognizes the speaker's speech and does not require any additional input from the speaker. Additionally, because in some embodiments cues are hand shaped images presented according to the manual cueing system, those embodiments allow cue receivers skilled in the manual system to use the new system and display with very little additional training or instruction.

Synchronization between the displayed cues and the speaker's speech and/or facial expression allows deaf people to understand a speaker more easily because the cue is displayed substantially at the same time as when the cued syllable is pronounced. Note that delaying the video allows for the synchronization of cue images with the times at which the corresponding phonemes are pronounced. Additionally, delaying the acoustic waveform and presenting it in synchrony with the corresponding images allows cue receivers with residual hearing to make best use of any auditory information they can extract from the speech signal.

In some embodiments, the cues, such as hand-shaped cues, are displayed in a manner so as to suggest to a viewer smooth motion between successive cues. In such embodiments, successive cues may also be changed in transition from one position to another. This improves the cues' realism, making it easier for cue receivers to follow the cues.

Adding secondary visual cues to the hand shaped cue images increases the discriminability of the cues and improves comprehension.

Computer implemented phone recognition and cueing enables a cue receiver to "listen" to individuals speaking a foreign language.

Embodiments of the invention are appropriate for persons who cannot read (for example, children) for whom closed-captioning would not be helpful.

Other advantages and features will become apparent from the following description and claims.

DESCRIPTION OF THE PREFERRED EMBODIMENTS

Figure 1:
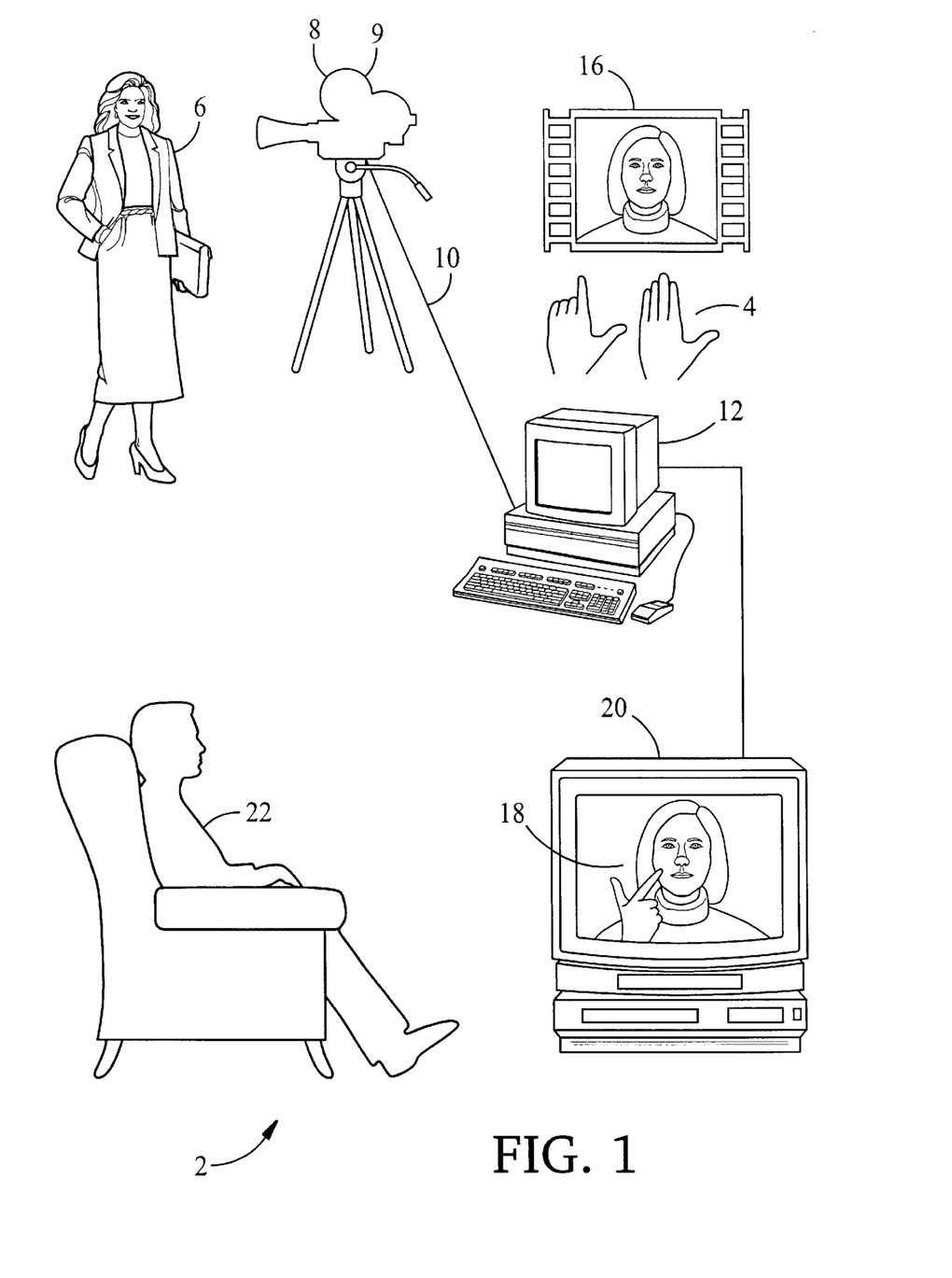
FIG. 1 is a diagram of an automatic cueing system.
Figure 2:
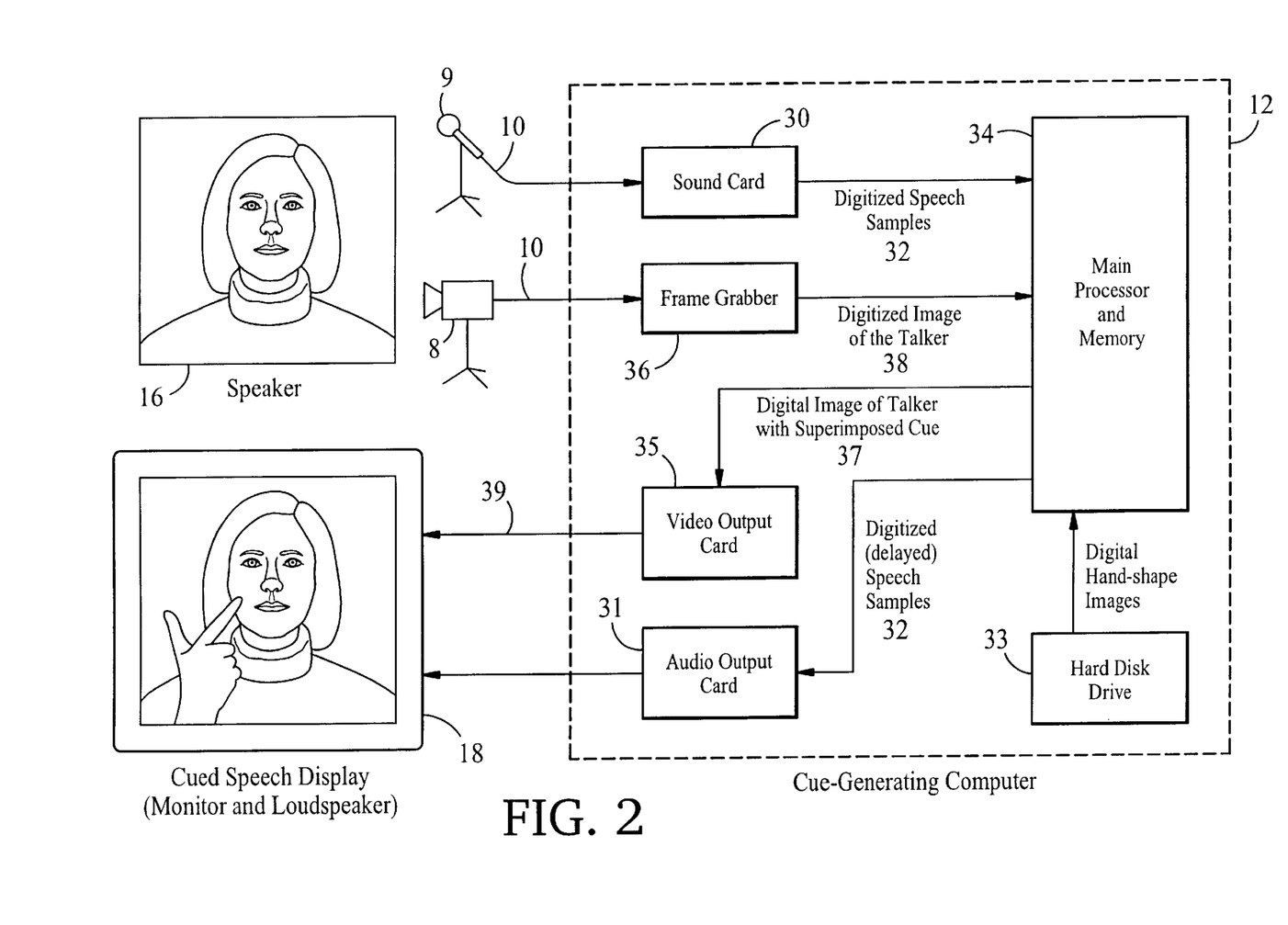
FIG. 2 is a block diagram of the automatic cueing system.

As seen in FIGS. 1 and 2, system 2 provides visual synthetic speech cues to an individual 22 with impaired hearing. System 2 processes a speaker's 6 speech and recognizes speech elements therein. System 2 then maps the recognized speech elements to corresponding synthetic speech cues 4 which emulate manual speech cues. These synthetic cues 4 may be images of synthetic hands which can be displayed in conjunction with conventional video images of speaker 6. This image combination has the advantage that the cues that form the basis of the standard Manual Cueing System can be employed (see NCSA (1994), "Guidelines on the Mechanics of Cueing" *Cued Speech Journal*, V, 73–80., hereinafter, the "Manual Cueing Guidelines" and Gallaudet University, Dept of Audiology and Speech-Language Pathology. "Cued Speech Beginner's Practice Materials Booklet."). Synthetic speech cues 4 are superimposed on video images of speaker 6 in an appropriate position. System 2 allows experienced cue receivers to comprehend speakers not familiar with manually cueing speech, without extra training.

Referring to FIG. 2, we will now describe the architecture and function of system 2 in detail. System 2 includes a video camera 8 and a microphone 9 which acquire an analog video image signal and an analog acoustic speech signal of the speaker, respectively. These signals are transmitted over a cable 10 to a computer 12 which can be a digital workstation computer.

The analog acoustic speech signal is applied to the input of a sound card 30 connected to a system bus of computer 12. Sound card 30 digitizes the speaker's speech waveform at a sampling rate of 10 kHz with 16-bit resolution. The resulting digital speech samples 32 are delivered to a main processor 34 of computer 12 which stores the samples in a memory of computer 12.

The analog video image signal representing the speaker's face is captured by a frame grabber card 36 where it is digitized at the rate of 30 video images/second. Frame grabber 36 samples the video signal into digital images 38 at a specified resolution and color depth and makes digital images 38 available on the system bus for transfer to the main memory of computer 12. Digital video image 38 is then stored by main processor 34 while the identity and time boundaries of each phone are determined. Both the input 9 and output video images 39 can be in NTSC, or PAL format for compatibility with standard video hardware such as cameras, monitors, and recording devices.

Since typical video sources produce 35 MB of data per second, the system bus is desirably a high speed bus for connecting various peripheral and system components. Further, each video datum travels on the system bus twice, once on its way into the main memory and a second time on its way from the main memory to a video output card 35. Thus, the bandwidth requirements for the system bus and related hardware in a particular video mode are doubled, as there are effectively two separate video streams over the same bus. The bandwidth requirements can be met by using a 32-bit wide Peripheral Connect Interface (PCI) bus which offers continuous data transfer rates of up to 120 MB/sec and by using a Direct Memory Access (DMA) protocol which allows video data to be transferred between frame grabber 36, memory, and video output card 35 without the need for intervention by the main processor.

To provide adequate time for processing the speech and determining the appropriate cue sequence, the video image is delayed an appropriate amount of time before being played back. The audio signal is also delayed by the same amount before being played back to achieve synchronization between the audio and video components. The cue elements in the cue sequence are synchronized with composite video images 37 and audio samples 32.

The technique for delaying the video is as follows. Each digital video image 38 is stored in a circular buffer (not shown) in the main memory of computer 12. The circular buffer stores two seconds of video (here, 60 digital video images 38 or 120 fields). Therefore, each digital video image 38 is delayed for two seconds from the time the frame is stored in the buffer to the time it is retrieved from the buffer for display. As each digital video image 38 is removed for display, a new digital video image 38 is added to the buffer. Audio signal delay is also timed using a similar technique.

To display images of the cues in conjunction with the face of the speaker in digital video images 38, a display generating program 64 (FIG. 3) extracts digital image 38 of the speaker's face from the buffer and overlays a synthetic speech cue recognized for that particular image to produce a composite video image 37. Composite video image 37 is then transferred into an on-board buffer memory of video output card 35. Video output card 35 converts composite video image 37 into a VGA format analog signal appropriate for display on a VGA computer monitor. The analog video signal has an output video display rate which is the same as the 30 video images/second sampling rate used by frame grabber card 36. The output video signal is capable of being displayed on a standard television monitor 20 and recorded by a conventional VCR. Such an output video signal clearly adds a desirable flexibility to the system.

At the same time, stored audio samples 32 corresponding to that video image 37 are delivered to an audio output card 31 which converts audio samples 32 to an analog audio signal for play back.

We will now describe the process of recognizing phones in a speaker's speech and the process of determining cues corresponding to those phones. We will then describe the process of generating composite video image 37. Briefly, digital speech samples 32 are continuously processed by main processor 34 to recognize the phones associated with successive segments of the speech of the speaker. The resulting stream of recognized phones is mapped to a sequence of cue labels, each specifying a synthetic cue shape and position. After mapping, the cue sequence is used to generate composite video images 37 which are played back.

Figure 3:
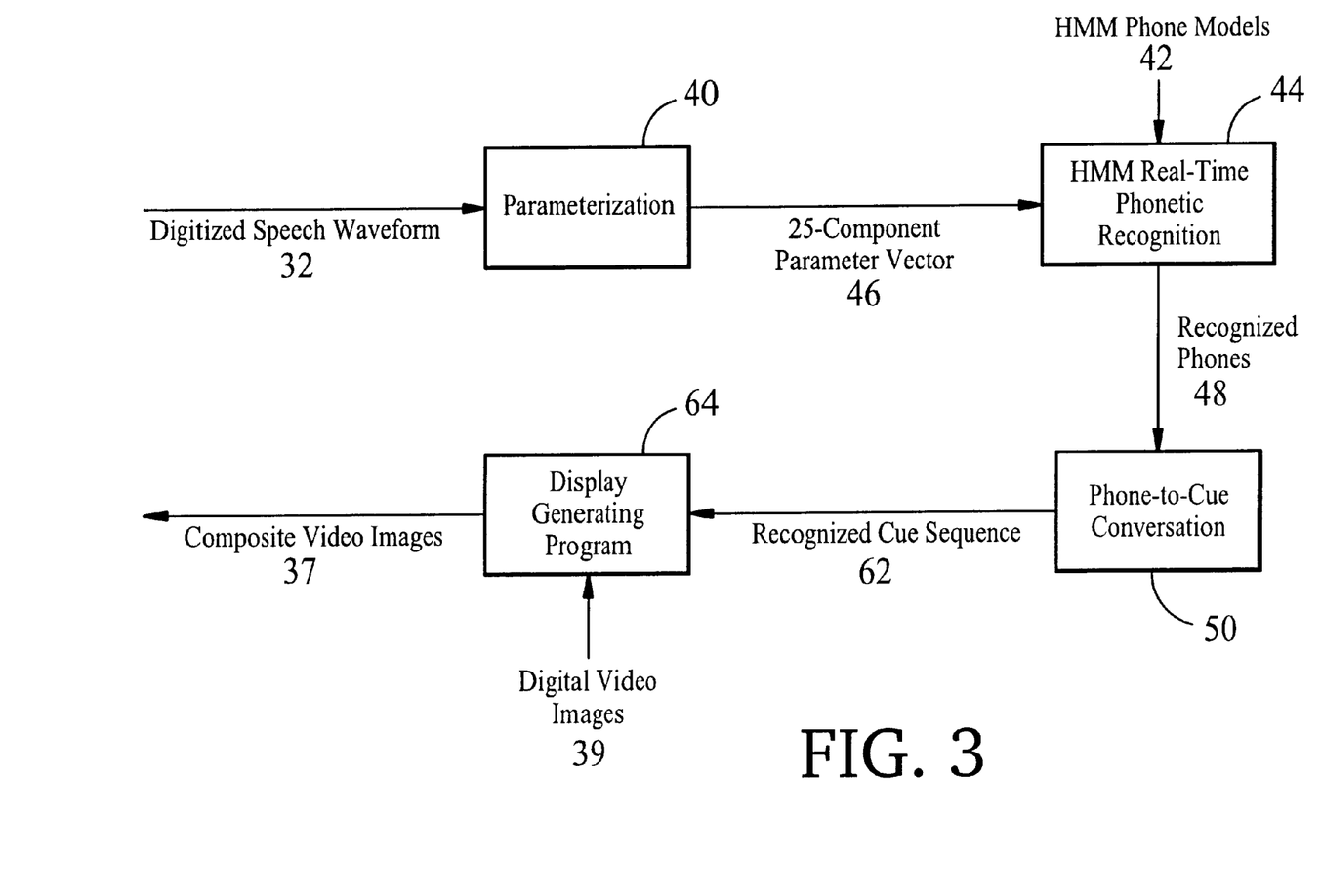
FIG. 3 is a block diagram of a computer program for generating cues.

Referring to FIG. 3, to determine which phones are present, digital speech samples 32 are processed by a phone recognition program 44 stored in the memory of computer 12 and executed by main processor 34. Phone recognition program 44 assigns start and end times to phones and produces the most likely phonetic transcription of the input. The basic recognition technique used by phone recognition program 44 is that of Hidden Markov Models (HMM) with Viterbi search. The software used to implement phone recognition program 44 can be derived from the HMM Toolkit (HTK) from Entropic Research Laboratories, Inc. (Entropic Research Laboratories, Inc. HTK: Hidden Markov Model Toolkit V1.5, Dec. 7, 1993). In such an implementation of phone recognition program 44, training of phonetic models 42 can be accomplished directly using programs in the HTK. However, the recognition routines available from the HTK can be modified to achieve real-time phonetic recognition with a high degree of accuracy as will be described in detail below.

Prior to phone recognition software 44 processing digital speech samples 41, a parameterization program 40 preprocesses them. Parameterization program 40 converts digital speech samples 32 to a more suitable representation for phone recognition program 44 to perform statistical pattern matching. Parameterization program 40 retrieves the speech samples in groups or "frames" of 200 samples with 100-sample overlap between successive frames. Each frame is approximately a 20 ms segment of speech. Each frame is pre-emphasized by a high pass filter with a z-domain transfer function of $1-0.97z^{-1}$ and multiplied by a Hamming window. The frame is then processed by a HTK routine which computes a 25-element parameter vector 46 composed of the following:

Twelve (12) mel-frequency cepstral coefficients

Twelve (12) difference cepstral coefficients

One (1) difference energy coefficient Phone recognition program 44 either immediately uses parameter vector 46 in the recognition computation or, if phone recognition program 44 is not ready for parameter vector 46, parameter vector 46 is stored in the memory for subsequent use by phone recognition program 44. Note that the digital speech samples 32 remain stored in memory until being played back by audio output card 31 along with the output video signal 39.

Figure 4:
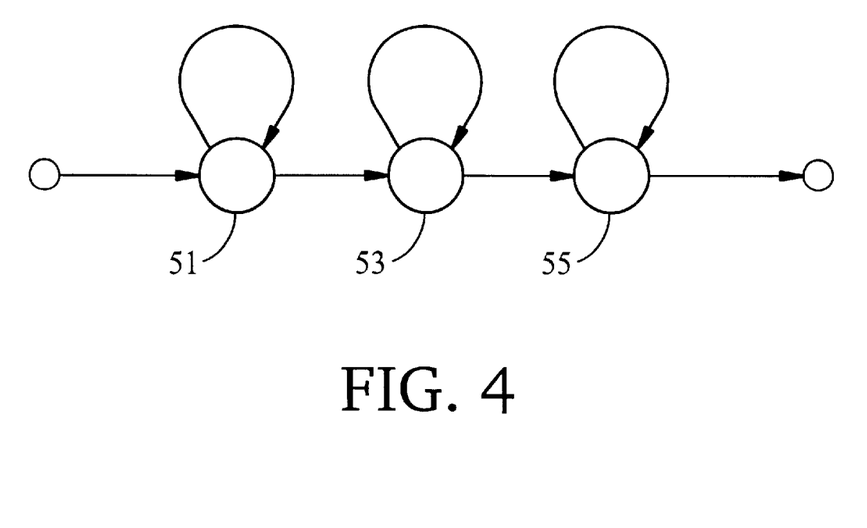
FIG. 4 is a diagram of a Hidden Markov Model.
Figure 5:
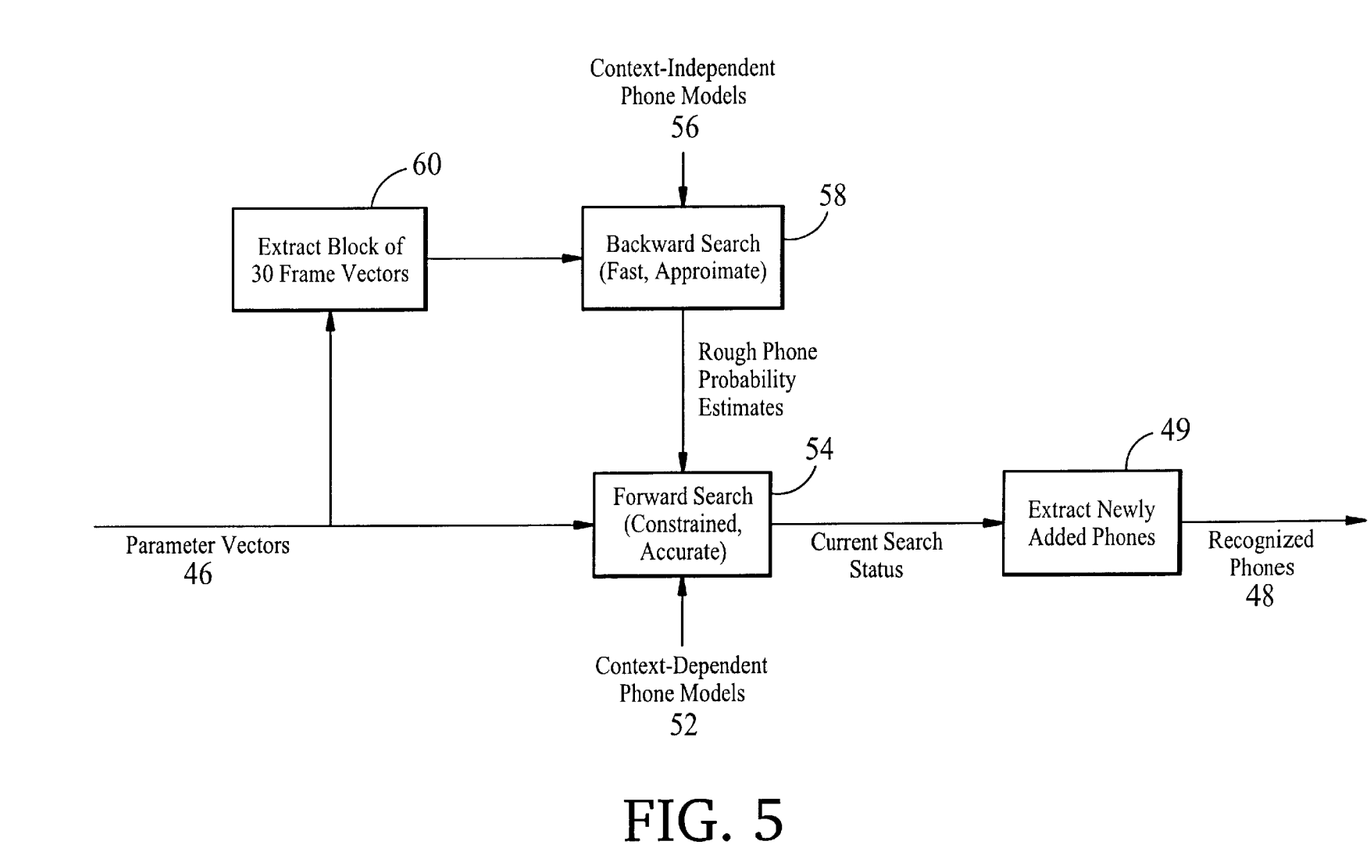
FIG. 5 is a block diagram of a real-time computer implemented phone recognition process.

The recognition process performed by phone recognition program 44 itself is based on a Forward-Backward search algorithm (See for example Austin, S., Schwartz, R., and Placeway, P. "The Forward-Backward Search Algorithm." *Proceedings of ICASPP*-91, Toronto, May 1991, pp.697–700). Referring to FIG. 5, phone recognition program 50 includes a forward search module 54 and backward search module 58. In either module, phone recognition program 44 processes parameter vector 46 to recognize the phones in the spoken speech using HMM Phone Models 42. Referring also to FIG. 4, each HMM Phone Model 42 has three states 51, 53, 55. Generally, after receiving a parameter vector 46, phone recognition program 44 divides that parameter vector 46 into two vectors—one with 12 static coefficients, the other with 13 difference coefficients. Phone recognition program 44 then models the observation probabilities of these sub-vectors with mixtures of six Gaussian distributions in each state to determine the likelihood of a particular phone occurring at the present point in the spoken speech under analysis.

Forward search module 54 uses context-dependent HMM phone models 52 in a conventional Viterbi beam search based on HTK code. On its own, forward search module 54 yields accurate recognition since context-dependent models 52 are detailed. However, the accuracy is achieved at the cost of long and possibly excessive computation times. Hence, results from backward search module 58 are used to reduce the computation times in the described embodiment by constraining the search or computing the beam by forward search module 54. Backward search module 58 uses the less accurate but more time efficient context-independent HMM models 56.

We will now briefly describe context-dependent and context-independent phone models. Table I lists the basic phones that phone recognition program 44 models and recognizes. Context-independent HMM models 56 provide an HMM model for each of these phones which models that phone irrespective of the preceding or following phonetic context of the phone.

TABLE I

| Phone | Example | Phone | Example | Phone | Example |
|---|---|---|---|---|---|
| iy | beet | r | ray | k | key |
| ih | bit | y | yacht | dd | udder |
| eh | bet | w | Way | dt | utter |
| ae | bat | er | bird | z | zone |
| ax | about | m | mom | zh | usual |
| ah | but | n | noon | v | van |
| uw | boot | en | button | f | fin |
| uh | book | ng | sing | th | thin |
| ao | bought | ch | choke | s | sea |
| aa | cot | jh | joke | sh | she |
| ey | bait | dh | then | h | hay |
| ay | bite | b | bee | cl | unvoiced closure |
| oy | boy | d | day | vcl | voiced closure |
| aw | bout | g | gay | sil | silence |
| ow | boat | p | pea | | |
| l | lay | t | tea | | |

In context-dependent phone models, such as context-dependent phone models 52, separate models are obtained for a phone such as "iy" (refer to Table 1) when that phone is surrounded by (i.e. is in the context of) a distinct pair of phones, for example, "b-iy-d", "p-iy-t", and "d-iy-p". (For example, see Kai-Fu Lee. "Automatic Speech Recognition." Norwell, Mass.: Kluwer Academic Publishers, 1989 and Schwartz R. et al. "Context-Dependent Modeling for Acoustic-Phonetic Recognition of Continuous Speech." *Proceedings of ICASSP*-85, 31.3.1–4. Tampa, Fla., Apr. 1985) Having separate phone models for each possible context of each phone can lead to an intractable number of models, e.g. $46^3 = 97336$. Therefore, to constrain the search computation, the contexts are generalized by grouping phones into context classes and treating the phones in the same context class as specifying the same context. In the described embodiment, thirteen context classes are used. These classes are listed in Table 2. In accordance with the context classes in Table 2, in the case of the above example, the phones "b-iy-d" and "p-iy-t" are represented by the same model while "d-iy-p" is represented by a different model.

Even with the thirteen context classes in Table 2, there are 7774 possible phone models. In the described embodiment, to further limit the number of phone models that have to be inspected during the phone recognition process, only the 3500 most frequently occurring context-dependent phone models in training data are used. (The training data can be The TIMIT Database National Institute of Standards and Technology, "TIMIT—Acoustic-Phonetic Continuous Speech Corpus" *NIST Speech Disc* 1–1.1, October 1990.)

TABLE 2

Assignment of phones to context classes.
(Note that, for purposes of context forming, closures are considered to be part of the stop that follows them.)

| Class code | Class description | Phones in Class |
|---|---|---|
| FH | front/high vowels | iy ih y |
| FL | front/low vowels | ae ey eh |
| BH | back/high vowels | uh uw w |
| BL | back/low, mid vowels | ao aa ow ay oy aw |
| NR | neutral, retroflex vowels | ah ax er |
| N | nasals | m n ng en |
| LS | labial stops | p b |
| AS | alveolar stops | t d ch jh dd dt |
| VS | velar stops | k g |

TABLE 2-continued

Assignment of phones to context classes.
(Note that, for purposes of context forming, closures are considered to be part of the stop that follows them.)

| Class code | Class description | Phones in Class |
|---|---|---|
| DF | dental fricatives | f v dh th |
| AF | alveolar fricatives | s z sh zh |
| L | liquids | l r |
| S | silence, etc. | sil h |

The phone recognition process executed by phone recognition program 44 is as follows. Backward search module 58, implemented by modified HTK code in the described embodiment, processes each new block of parameter vectors 46 associated with 30 frames of speech as such new blocks become available from parameterization block 40. Using context-independent HMM models 56, backward search module 58 processes each block by performing a backward search beginning with the last frame in time and proceeding to the first frame in time. Backward search module 58 then provides a computationally efficient estimate of the most likely phones present in each block of parameter vectors 46.

The forward search space for a block of parameter vectors 46 is then restricted to only those context-dependent models 52 whose corresponding context-independent 56 versions were found by backward search module 58 sufficiently likely to be present in the block of parameter vectors 46. Forward search module 54 then proceeds to process the block by performing a forward search beginning with the first frame in time and proceeding to the last frame in time. As forward search module 54 recognizes phones, forward search module 54 sends the recognized phones to the subsequent module, which is recognition module 49. It should be noted that forward search module 54 proceeds only after backward search module 58 has processed the latest block of parameter vectors 46 and produced its estimates.

The above described combination of the backward search and forward search algorithms achieve an acceptable compromise between speed and accuracy. Additionally, the backward-forward search algorithm described above is particularly advantageous for realtime speech recognition because of the order in which the two searches are performed. Because the forward search module 54 determines the final recognition results, forward search module 54 can output recognized phones to downstream modules as soon it recognizes them. If the final recognition results were determined by backward search module 58, the downstream modules would have to wait until backward search module 58 completed its analysis of the block and then was able to output the recognized phone in the order they appeared in the speech.

Additionally, the recognition process is performed on a block of frame which have a predetermined length (here, 30 frames), as opposed to blocks of frames whose length depends on naturally occurring interruptions in the speech (e.g. sentence, phrase, words, etc.). Therefore, phones are recognized and provided to downstream modules with a fair degree of predictability and regularity which makes implementing realtime processing simpler.

As an additional safeguard against excessive recognition delays, the number of possible phone sequences considered in the forward search beam is dynamically adjusted. Each time a block of parameter vectors 46 is processed by backward search module 58, the time elapsed since the last of those frames actually occurred is checked. If this time (that is, lag time or delay) is longer than a pre-selected amount of time (here, 1 second), the number of possibilities examined by forward search module 54 is reduced to speed up the processing by forward search module 54. If the time is less than another pre-selected amount of time (here, 0.75 seconds), the number of possibilities examined is increased to allow a more accurate search. Hence, the process is regulated to keep the lag time or delay to be substantially a predetermined value (which can be a range of values).

After forward search module 54 has finished recognizing a sequence of phones for the current block of 30 parameter vectors 46, recognition module 49 analyzes the results from forward search module 54 to determine which phones should be validated as recognized phones 48 to be passed to a phone-to-cue conversion program 50. Recognition module 49 validates a phone if the phone ends no less than 10 frames (100 milliseconds) before the last frame of speech examined. Any phone recognized after that point and any partial results for that block of 30 frames are then stored and processed with the following block of 30 frames. Such recognized phones are then sent out during the processing of the next block of 30 frames.

Moreover, before passing recognized phones 48 to phone-to-cue conversion program 50, recognition block 49 merges closures with their following phones. A closure represents a period of silence immediately preceding a plosive burst (the stop consonants p,b,t,d,k, and g) that is best modeled as a separate entity.

Phone-to-cue conversion program 50 receives the stream of recognized phones 48 and the start times of these recognized phones. Referring back to FIG. 3, phone-to-cue conversion program 50 converts the stream of phones into a sequence of corresponding cues. Since each cue typically corresponds to more than one phone, phone-to-cue conversion program 50 uses a two-dimensional array to keep a history of the three most recent phones and their start times. Once enough phones have been received to specify a cue unambiguously, phone-to-cue conversion program 50 stores in a memory buffer the codes for the appropriate synthetic cue shape and its location in the video image as well as a start time for the cue. The cue start time is the start time of the first phone that is included in the cue. Otherwise, phone-to-cue conversion program 50 stores the phones that have not yet been converted to cues in the array and waits for more phones to be received from phone recognition program 44.

We will now describe the operation of phone-to-cue conversion program 50 in detail. Phone-to-cue conversion program 50 acts as a finite state machine which has six states. The active state of the finite state machine depends on the number and type of recognized phones 48 which have been received but have not yet been converted to cues. Generally, in each state, if phone-to-cue conversion program 50 generates a cue, phone-to-cue conversion program 50 removes the corresponding phones from the array. However, if in a state, phone-to-cue conversion program does not generate a cue, phone-to-cue conversion program 50 does not remove any phones from the array. In either case, the next phone in the stream of phones 48 is accepted from phone recognition program 44 and added to the array. The current phones in the array, including the newly added phone, then determine the new state.

The states and the actions that are taken in them are as follows:

1. Silence. In this state, the speaker 6 is not talking. Therefore, no cues should be displayed. The phone-tocue conversion program 50 stores the start time for the silence and special codes (for example, 0, 0) to indicate that no cue has been recognized for this interval. The silence is removed from the array.

2. Consonant Only. This state occurs when a single consonant has been recognized in the time period since the last cue was determined. Since a cue does not necessarily consist of only one consonant, it is necessary to know the next phone before the appropriate cue can be resolved. Phone-to-cue conversion 50 program generates no cues.

3. Consonant-consonant. If a consonant is followed by another consonant then the cue for the first consonant alone should be displayed. In this case, phone-to-cue conversion program 50 stores the start time for the first consonant and the code for the synthetic cue shape 4 corresponding to that consonant and the code for the side position required for this type of cue. The first consonant is removed from the array.

4. Consonant-silence. If a consonant is followed by a silence then the cue for the consonant alone should be displayed. Phone-to-cue conversion program 50 stores the start time for the consonant and the code for the synthetic cue 4 corresponding to the consonant and the code for the side position required for this type of cue. The consonant is then removed from the array. The silence would then be treated as per the first state described above, that is, phone-to-cue conversion program 50 stores the start time for the following silence and special codes (for example, 0,0) to indicate that no cue has been recognized in that time interval. The silence is then removed from the array.

5. Consonant-Vowel. If a consonant is followed by a vowel, then the synthetic cue 4 for the consonant-vowel combination should be displayed. In this case, phone-to-cue conversion program 50 stores the start time for the consonant and the codes for the synthetic cue 4 corresponding to the consonant and the position required for the vowel. Both phones are removed from the array.

6. Vowel Only. When a single vowel has been recognized, a cue should be displayed at that point. In this state, phone-to-cue conversion program 50 stores the start time of the vowel and the codes for the "no-consonant" synthetic cue shape and the position required for the vowel. The vowel is removed from the array.

After determining a cue, phone-to-cue conversion program 50 determines the cue start time for that cue. The start times delivered by phone recognition program 44 are determined by the timing of acoustic events, namely the start time of the first recognized phone associated with the cue. An advantage of the described embodiment is that, because the audio and video components are delayed, these start times may be adjusted to synchronize the cues to the speaker's facial actions. The synchronization can take into account the fact that pronouncing some phones results in visible facial actions preceding any audible sound. This can be thought of as a facial action "set up" time for pronouncing that phone. Phone-to-cue converter 50 subtracts a set amount of time from each cue start time to account for this facial action set up time. The particular adjustment determined to be near optimal is 10 frames (or 100 milliseconds).

In some embodiments, the subtracted amount of time is varied to take into account that facial action set up times associated with different phones vary. The facial action set up time for some phones is longer than is the case for some other phones. For example, the phone "b" may have a longer facial action set up time than the phone "s". A look up table can be used to store the amounts of time associated with various phone for a typical person. Phone-to-cue conversion program 50 can also take into account the immediately preceding recognized phone or other factors such as accent of the speaker to adjust the amount subtracted to compensate for the facial action set up time.

In some embodiments, the cue is synchronized to be displayed before the start of the facial action so that the cue receiver is alerted to the characteristics of an upcoming phone. In this manner, cue receiver's comprehension may be further enhanced.

After determining a cue and its start time, phone-to-cue conversion program 50 stores the cue sequentially in a memory buffer where it can be accessed by display generating program 64 as needed. The stored cue includes its adjusted start time, the synthetic cue code, and the position code. It should be noted that, since phone recognition program 44 groups the audio samples into frames of speech every 10 milliseconds, the time-resolution with which cue start times can be determined and adjusted is also 10 milliseconds. The cue start times are therefore expressed as the number of frames from the moment the system was initialized (e.g. start time of 1200 (frames) corresponds to 12 seconds). Digital video images 38 also have time stamps which are referenced to the same time. This allows for more accurate synchronization of cues and images.

Having described how phone-to-cue conversion program 50 determines the appropriate cues for the recognized phones, we will now describe how display generating program 64 generates composite video images 37 based on the results from phone-to-cue conversion program 50. Display generating program 64 stored in the memory of computer 12 retrieves the stored cues and corresponding digital video images 38 to generate composite video images 37. Generally, to generate composite video image 37, display generating program 64 computes a location in the retrieved video digital image where the cue should be placed relative to the face as dictated by the rules of Manual Cued Speech which is set out in position code stored with the cue. There are eight hand shaped images used for the Manual Cued Speech, as specified by the Manual Cueing Guidelines. These images are pre-stored on disk 33 for the program's access. These images are digital images of actual hands. Display generating program 64 overlays on a retrieved digital video image an appropriate hand shaped cue image at the appropriate location in the retrieved image to produce a composite video image. In overlaying the hand shaped cue image, the pixels representing the hand shaped image replace the pixels of the video digital image at the appropriate location.

We will now describe the operation of display generating program 64 in more detail. To generate composite video images 37, display generating program 64 analyzes the following inputs:

1. The current image to be displayed and its time stamp S (in 10 ms frames).

2. Input cue data, each specifying a starting time in frames and a hand shape and position (e.g. "FRAME 100, SHAPE 2, POSITION THROAT").

3. A linked list of received cue data. The newest cue is stored at the end of the list, and expired cues (those whose times are much earlier than the current frame "F" to be displayed) are removed.

4. The set of synthetic cue shape images. Each image includes a well defined point that should be positioned at a canonical cue location about the face according to MCS rules. For example, when drawing hand shape 1 of Manual Cued Speech (see FIG. 1), the tip of the index finger must touch the corner of the mouth during the MOUTH position).

5. A set of rules to describe how the synthetic cue moves between canonical positions, as explicitly described below.

An overlay routine in display generating program 64 attempts to reproduce the coarticulation present in the transition of the synthetic cue from position to position and shape to shape for better simulated manual cueing. To present a more realistic transition of the hand from one cue position to the next, both the current and the next cue are considered in the placement of the cue image. After the cue image has been displayed at the current cue position for several frames, the cue image follows a linearly interpolated path to the next cue position, arriving at the start time for the next cue. The synthetic cue shape changes from the current to the next shape at a selected point along the path between the two cue positions, hence suggesting to a viewer as a smooth motion and transition between successive cues. The appearance change may be also improved by fading from one cue to the next.

Each time the video display is to be refreshed (here, approximately every ⅟₃₀ second), the next-digital video image 38 (i.e. current frame "F") is retrieved and overlayed with the cue image in its "proper" position and shape. The proper position is calculated by searching the linked list of cues for the pair of cues (at times T1 and T2) whose times bracket the current frame F. If the start time of the current frame F falls directly on a cue's starting time, the position and cue shape are used to overlay the current frame F. If the start time of the current frame F does not fall directly on a cue's starting time, the proper position and shape are determined by the following rules which determine the cue image trajectory between two canonical shape/position cues at times T1 and T2:

1. The cue image stays in the current position if it has nowhere else to go, i.e. if there were no bracketing times T1 and T2 because the last cue in the list began before the current frame F. This may occur if phone-to-cue conversion program 50 is temporarily late with cue identification.

2. When the cue image moves, it does so in a piecewise-linear trajectory. The velocity is constant for any one transition between target positions but may vary from transition to transition.

3. If there is a long enough period of serial SILENCE cues, (greater than the controllable parameter CUE-TIME-SILENCE), then an "artificial" hand position (REST POSITION) is used at the time of the first SILENCE cue to exceed the CUE-TIME-SILENCE grace period. The CUE-TIME-SILENCE parameter may be set to 1 second.

4. If the synthetic cue shape at T1 (T1-cue) is different than that of T2-cue, the cue image abruptly changes shape from T1-cue to T2-cue at a selected point in the transition between the target positions, as described above. The relative position of the change along the transition between the two cues is determined by a controllable parameter CHANGE-PERCENT. We have determined to be near optimal (from a human cue receiver's point of view), the change should be at half way point, that is, at 50% of the way between the two cues. Note that special rules apply in the case of diphthongs to be described below in reference to rules 7–9.

5. For non-diphthong cues, the cue image remains stationary for at least a fixed number of frames (here, designated by CUE-TIME-START which is set to 10) at T1-cue's position before starting its motion to T2-cue's position. If this much time is not available, the time is reduced to whatever duration is available i.e. T2–T1.

6. The time spent traveling from T1-cue's position to T2-cue's position is a constant number of frames (here, designated by CUE-TIME-BETWEEN which is set to 15). If this much time is not available (e.g. because of fast speech), then the motion lasts for however much transition time remains after obeying rules 5 and 8.

Another manner of expressing rules 5 and 6 for a non-diphthong cue at time T1 where another cue follows the non-diphthong cue at time T2 is the following equation:

$$D = \min(\max(0, T2-T1-\text{CUE-TIME-START}), \text{CUE-TIME-BETWEEN})$$

where D is the duration of the cue image's movement from T1-cue's position to T2-cue's position. Clearly, the time T1-cue stays motionless before moving is T2–T1–D.

7. If T1-cue is a diphthong cue, an "artificial" cue datum is inserted between T1 and T2. The position of this cue is the target of the diphthong, and its "starting" time TD is determined by rule 8 below. When moving between T1-cue and TD-cue, the cue image does not obey rule 5 but instead begins moving immediately. The transition from TD-cue to T2-cue is governed by rules 4, 5, and 6.

8. A diphthong's motion takes at least CUE-TIME-DIPHTHONG (here, set to 20) frames if available. This rule supersedes rule 5. Thus, for a diphthong, duration $D_{DIPHTHONG}$ of the movement of the image of T1-cue from the end of the diphthong at time TD to the position of T2-cue position is expressed by the following equation:

$$D_{DIPHTHONG} = \min(\max(0, T2-T1-\text{CUE-TIME-DIPHTHONG}), \text{CUE-TIME-BETWEEN})$$

. The intermediate time TD and thus the duration of the diphthong's movement is thus given by $$TD = T2 - D_{DIPHTHONG}$$

9. During a diphthong, the cue image shape changes from the initial synthetic cue shape to an "open" hand shaped associated with manual cued speech at a selected point in the diphthong motion. This selected point is determined by a parameter CUE-TIME-CHANGE-DIPHTHONG percent (here, set to 75%) which determines where in the diphthong motion the cue image is changed.

10. The "flick" forward and "tug" down from the side position are processed in the same manner as a diphthong with the rule 8 variable CUE-TIME-DIPHTHONG being replaced by CUE-TIME-FLICK (here, set to 15 frames).

Referring back to FIG. 2, as described above, as display generating program 64 generates composite digital video images 37, they are sent to video output card 35 which generates corresponding output analog video signals 39.

Other embodiments are within the scope of the following claims.

For example, in some embodiments, the digital image is enhanced by supplementary visual features or elements to enhance the "discriminablity" of the digital image of the hand. Discriminability is a term used in psycho-physical research to refer to the ability of people to distinguish between various stimuli. In this case, it refers to the ability of a cue receiver to distinguish between different cues. Enhancing discriminablity increases the comprehension by a cue receiver of the displayed cues.

The supplementary visual features used to enhance images of the cues include various visual signs. For example, the image of the hand may be outlined. The outlining may be for example a black border around the contour of the image of the hand. The color of the images of the hand shaped cues may also be changed from cue to cue to signal the change from one cue to another and therefore assist a cue receiver discriminate and distinguish one cue from another. Color can be characterized by brightness, hue, and saturation values. A change in color may be accomplished by varying one, some, or all of these values. Additionally, the size of the hand may be varied from cue to cue. The hand shape image may be displayed as having a particular texture. The representation of the texture of the hand shape image may be changed, for example, by displaying alternate rough and smooth textures for added contrast.

What is claimed is:

1. A computer-based method for use in speech cueing, comprising
   recognizing speech elements initially delivered by a speaker,
   displaying a sequence of video images showing the speaker delivering the speech elements, the displayed video sequence being delayed relative to the initial delivery of the speech elements by the speaker, and
   in conjunction with displaying the sequence of video images, displaying an image of one of a plurality of cues corresponding to the recognized speech elements with a timing that is synchronized to a visible facial action.

2. The computer-based method of claim 1 further comprising playing back an audio signal corresponding to the speech elements initially delivered by the speaker, the audio signal being synchronized with the displayed video sequence.

3. The computer-based method of claim 1 wherein the visible facial action corresponds to the recognized speech elements corresponding to said one cue.

4. The computer-based method of claim 3 wherein one of the cues has a start time for displaying the image of said one cue, the start time being synchronized to a beginning of the visible facial action.

5. The computer-based method of claim 4 further comprising determining the beginning of the visible facial action to be a predetermined period of time prior to a start time of the recognized speech elements.

6. The computer-based method of claim 5 wherein the period of time depends on a characteristic of the recognized speech elements.

7. A computer-based method for use in speech cueing, comprising
   displaying a sequence of video images showing a speaker delivering speech elements, and
   in conjunction with displaying the sequence of video images, displaying images of cues corresponding to the speech elements, each of the cues comprising a representation of a human hand in a discrete position, wherein the discrete positions of two successive different cues are different and one of the different cues is displayed at positions along a path between the two discrete positions.

8. The method of claim 7 further comprising:
   recognizing speech elements initially delivered by a speaker, and
   determining the cues corresponding to the speech elements based on the recognized speech elements.

9. The computer-based method of claim 7 in which the other one of the different cues is displayed at positions along a path between the two discrete positions.

10. The computer-based method of claim 7 further comprising determining a period of time between the display of one of the cues in its discrete position and the display of a successive one of the cues in its discrete position and wherein the smooth motion is suggested by displaying the cues during the determined period of time.

11. The computer-based method of claim 10 in which the cues are displayed in positions other than the discrete positions during the determined period of time.

12. A computer-based method for use in speech cueing, comprising
    displaying a sequence of video images showing a speaker delivering speech elements, the start times of the speech elements being delayed relative to the initial delivery of the speech elements by the speaker,
    recognizing the speech elements based on an acoustic signal from the speaker as the speech elements are delivered, and
    in conjunction with displaying the sequence of video images, displaying images of cues corresponding to the recognized speech elements at selected periods of time prior to the delayed start times of the recognized speech elements.

13. The computer-based method of claim 12 wherein the selected periods of time are the same for all cues.

14. The computer-based method of claim 12 wherein the selected period of time of one of the cues is different from the selected period of time of another one of the cues.

15. The computer-based method of claim 14 wherein the selected periods of times are selected based on a characteristic of the recognized speech elements.

16. The computer-based method of claim 12 further comprising:
    selecting the selected periods of time based on the start times of visible facial actions.

17. The computer-based method of claim 16 wherein the visible facial actions correspond to the recognized speech elements which correspond to the cues.

18. A computer-based method for use in speech cueing, comprising:
    displaying a sequence of video images showing a speaker delivering speech elements,
    in conjunction with displaying the sequence of video images, displaying images of hand cues corresponding to the speech elements, each of the hand cues comprising a representation of a human hand in a discrete position, wherein at least one cue is displayed with a supplementary visual feature.

19. The computer based method of claim 18 further comprising
    recognizing speech elements initially delivered by a speaker,
    determining the hand cues from the recognized speech elements.

20. The computer-based method of claim 18 wherein the supplementary visual feature includes an outline of the representation of the human hand for the cue, the outline being superimposed on the representation of the human hand.

21. The computer-based method of claim 18 wherein the supplementary visual feature includes a color of the representation of the human hand for the cue.

22. The computer-based method of claim 21 wherein the color is characterized by brightness, hue, and saturation values.

23. The computer-based method of claim 18 wherein the supplementary visual feature includes a size of the image of the human hand for the cue.

24. The computer-based method of claim 18 wherein the supplementary visual feature includes representation of texture in the image of the human hand.

25. A computer-based method for recognizing speech elements in speech delivered by a speaker, the method comprising:

receiving speech delivered by a speaker, performing a backward search on the speech using context-independent speech element models to provide estimates of speech elements likely to be present in the speech, using the estimates of speech elements to select context-dependent speech element models from among a set of context-dependent speech element models, and performing a forward search on the speech using the selected context-dependent models to recognize speech elements in the speech.

26. The computer based method of claim 25 wherein the speech element models include Hidden Markov Models.

27. The computer based method of claim 25 wherein the forward search and the backward search are performed on a segment of speech having a predetermined duration.

28. The computer based method of claim 27 further comprising outputting the recognized speech elements as the speech elements are recognized in the segment of speech.

29. A computer-based method for recognizing speech elements in speech initially delivered by a speaker, the method comprising:

receiving in real time speech delivered by a speaker, processing the speech in real time using a speech recognition process to recognize speech elements in the speech, the speech recognition process being characterized by a parameter that controls the speed of speech element recognition by the recognition process, determining a delay between a point in speech being processed in the processing step and a current point in time, and adjusting the parameter based on the determined delay.

30. The computer-based method of claim 29 wherein the parameter is adjusted to cause the determined delay to tend toward a predetermined value.

31. The computer-based method of claim 29 wherein adjusting the parameter includes:

if the determined delay is more than a first predetermined delay value, changing the parameter to increase the speed of speech element recognition by the recognition process, and if the determined delay is less than a second predetermined delay value, changing the parameter to decrease said speed.

32. The computer-based method of claim 31 wherein the first predetermined delay value is different from the second predetermined delay value.

* * * * *